United States Patent
Conti et al.

(10) Patent No.: US 7,884,612 B2
(45) Date of Patent: Feb. 8, 2011

(54) MULTI-COMPONENT FIELD SOURCES FOR SUBSEA EXPLORATION

(75) Inventors: Ugo Conti, El Cerrito, CA (US); Andrea Zerilli, Fiorenzuola d' Arda (IT); David Alumbaugh, Berkeley, CA (US); Martin Howlid, Slependen (NO); Leendert Combee, Asker (NO); Kevin Eyl, Lafayette, CA (US)

(73) Assignee: WesternGeco L.L.C., Houston, TX (US)

( * ) Notice: Subject to any disclaimer, the term of this patent is extended or adjusted under 35 U.S.C. 154(b) by 67 days.

(21) Appl. No.: 11/315,813

(22) Filed: Dec. 22, 2005

(65) Prior Publication Data

US 2007/0145980 A1    Jun. 28, 2007

(51) Int. Cl.
  G01V 3/10    (2006.01)
  G01V 3/15    (2006.01)
(52) U.S. Cl. ........................... 324/365; 324/332
(58) Field of Classification Search ............... 324/332, 324/365, 347
  See application file for complete search history.

(56) References Cited

U.S. PATENT DOCUMENTS

| | | | |
|---|---|---|---|
| 3,052,836 A | 9/1962 | Postma | |
| 4,047,098 A | 9/1977 | Duroux | |
| 4,078,510 A * | 3/1978 | Morgan | 114/144 A |
| 4,617,518 A | 10/1986 | Srnka | |
| 4,633,182 A | 12/1986 | Dzwinel | |
| 4,862,089 A * | 8/1989 | Sigal | 324/350 |
| H1490 H * | 9/1995 | Thompson et al. | 367/15 |
| 5,825,188 A * | 10/1998 | Montgomery et al. | 324/357 |
| 6,236,211 B1 | 5/2001 | Wynn | |
| 6,628,119 B1 | 9/2003 | Eidesmo et al. | |
| 6,696,839 B2 | 2/2004 | Ellingsrud et al. | |
| 6,717,411 B2 | 4/2004 | Ellingsrud et al. | |
| 6,859,038 B2 | 2/2005 | Ellingsrud et al. | |
| 7,002,350 B1 * | 2/2006 | Barringer | 324/350 |

FOREIGN PATENT DOCUMENTS

| | | |
|---|---|---|
| EP | 1309887 | 3/2004 |
| EP | 1256019 | 6/2004 |
| GB | 2070345 | 9/1981 |
| GB | 2385923 | 9/2003 |
| GB | 2390904 | 1/2004 |

(Continued)

OTHER PUBLICATIONS

Denney, Dennis, Hydrocarbon Exploration Using Marine Electromagnetic Techniques, Journal of Petroleum Technology, Aug. 2005, pp. 65-66, 69.

(Continued)

Primary Examiner—Reena Aurora

(57) ABSTRACT

A multi-component field source for surveying subsea formations includes at least two electrodes having a direction of motion, wherein the at least two electrodes are configured to produce an electric dipole in an orientation that is not parallel to both the direction of motion of the electrodes and the seafloor. A method for logging subsea formations includes transmitting electromagnetic energy into the subsea formations with at least two electrodes having a direction of motion and configured to produce an electric dipole in an orientation that is not parallel to both the direction of motion of the electrodes and the seafloor; and receiving signals that comprise electromagnetic energy that has traversed the subsea formations.

26 Claims, 13 Drawing Sheets

FOREIGN PATENT DOCUMENTS

| | | | |
|---|---|---|---|
| GB | 2 404 444 | * | 2/2005 |
| GB | 2404444 | | 2/2005 |
| WO | WO0214906 | | 2/2002 |
| WO | WO2005010560 | | 2/2005 |
| WO | WO2006052145 | | 5/2006 |
| WO | WO0214906 | | 4/2007 |

OTHER PUBLICATIONS

Boerner, David E. et al., Orthogonality in CSAMT and MT Measurements, Geophysics, vol. 58, No. 7, Jul. 1993, pp. 924-934.

Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.

Chave, Alan D. et al., Electrical Exploration Methods in Applied Geophysics vol. 2, Electrical Exploration Methods for the Seafloor, Chapter 12, 1991, pp. 931-966.

Constable, S. et al., Marine Controlled-Source Electromagnetic Sounding, Journal of Geophysical Research, vol. 101, No. B3, Mar. 10, 1996, pp. 5519-5530.

Constable, S. et al., Occam's Inversion: A Practical Algorithm for Generating Smooth Models from Electromagnetic Sounding Data, Geophysics, vol. 52, No. 3, Mar. 1987, pp. 289-300.

Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.

Edwards, R.N., Controlled Source Electromagnetic Mapping of the Crust, Encyclopedia of Solid Earth Geopysics, ed. James D. Van Nostrand Reinhold, New York, 1989, pp. 127-138.

Yuan, J. et al., Electromagnetic Assessment of Offshore Methane Hydrate Deposits on the Cascadia Margin, American Geophyiscal Union Fall Meeting, San Francisco, 1998, pp. 363-375.

Kearey, Philip, The Encyclopedia of the Solid Earth Sciences, Blackwell Scientific Publications.

Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.

Flosadottir, A. et al., Marine Controlled-Source Electromagnetic Sounding, Journal of Geophysical Research, vol. 101, No. B3, Mar. 10, 1996, pp. 5507-5517.

U.S. Dept. of Energy Office of Basic Energy Sciences, Division of Engineering and Geosciences, Two and Three-Dimensional Magnetotelluric Inversion, Technical Report: Dec. 1, 1991-May 31, 1994.

Grant, I.S. et al., Electromagnetism, Second Edition, John Wiley & Sons.

Kaufman, A. et al., Methods in Geochemistry and Geophysics, 16.

Kvenvolden, K. et al., A Primer on the Geological Occurrence of Gas Hydrate, Gas Hydrates: Relevance to World Margin Stability and Climate Change, Geological Society, London, Special Publications, 137, 9-30.

MacGregor, L. et al., The Ramesses Experiment—III. Controlled-Source Electromagnetic Sounding of the Reykjanes Ridge.., Geophys. J. Int. 1998, 135, pp. 773-789.

MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.

Nekut, A. et al., Petroleum Exploration Using Controlled-Source Electromagnetic Methods, Proceedings of the IEEE, vol. 77, No. 2, Feb. 1989.

Sinha, M. C. et al., Evidence for Accumulated Melt Beneath the Slow-Spreading Mid-Atlantic Ridge, Phil. Trans. R. Soc. Land. A, 355, 1997, pp. 233-253.

Sinha, Martin, Controlled Source EM Sounding: Survey Design Considerations for Hydrocarbon Applications, LITHOS Science Report Apr. 1, 1999, 95-101.

Sinha, M. et al., An Active Source Electromagnetic Sounding System for Marine Use, Marine Geophysical Researches 1990, 12: 59-68.

Tseng, H. et al., A Borehole-to-Surface Electromagnetic Survey, Geophysics vol. 63, No. 5, pp. 1565-1572.

Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.

Das, Umesh C., Frequency- and Time-Domain Electromagnetic Responses of Layered Earth-A Multiseparation, Multisystem Approach, Geophysics vol. 60, No. 1, Jan.-Feb. 1995, pp. 285-290.

Thompson, Arthur H. et al., U.S. Statutory Invention Registration H1490, Sep. 5, 1995.

Walker, Peter W. et al., Parametric Estimators for Current Excitation on a Thin Plate, Geophysics vol. 57, No. 6, Jun. 1992, pp. 766-773.

Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.

Yuan, J. et al., The Assessment of Marine Gas Hydrates through Electrical Remote Sounding: Hydrate without a BSR?, Geophysical Research Letters, vol. 27, Aug. 2000, pp. 2397-2400.

Yuan, Edwards et al., Electromagnetic Assessment of Offshore Methane Hydrate Deposits on the Cascadia Margin, MARELEC, 1998.

Maurer, Hansruedi et al., Optimized Design of Geophysical Experiments, SEG Paper.

Grant, I.S. et al., Electromagnetic Waves, Chapter 11, pp. 365-407.

Search and Examination Report, UK Intellectual Property Office, pp. 1-4 (Apr. 3, 2007). GB0625335.5.

Examination Report, UK Intellectual Property Office, pp. 1-2 (Jun. 23, 2008). GB0625335.5.

Further Exam Report for corresponding GB application 0625335.5, dated Aug. 6, 2009.

* cited by examiner

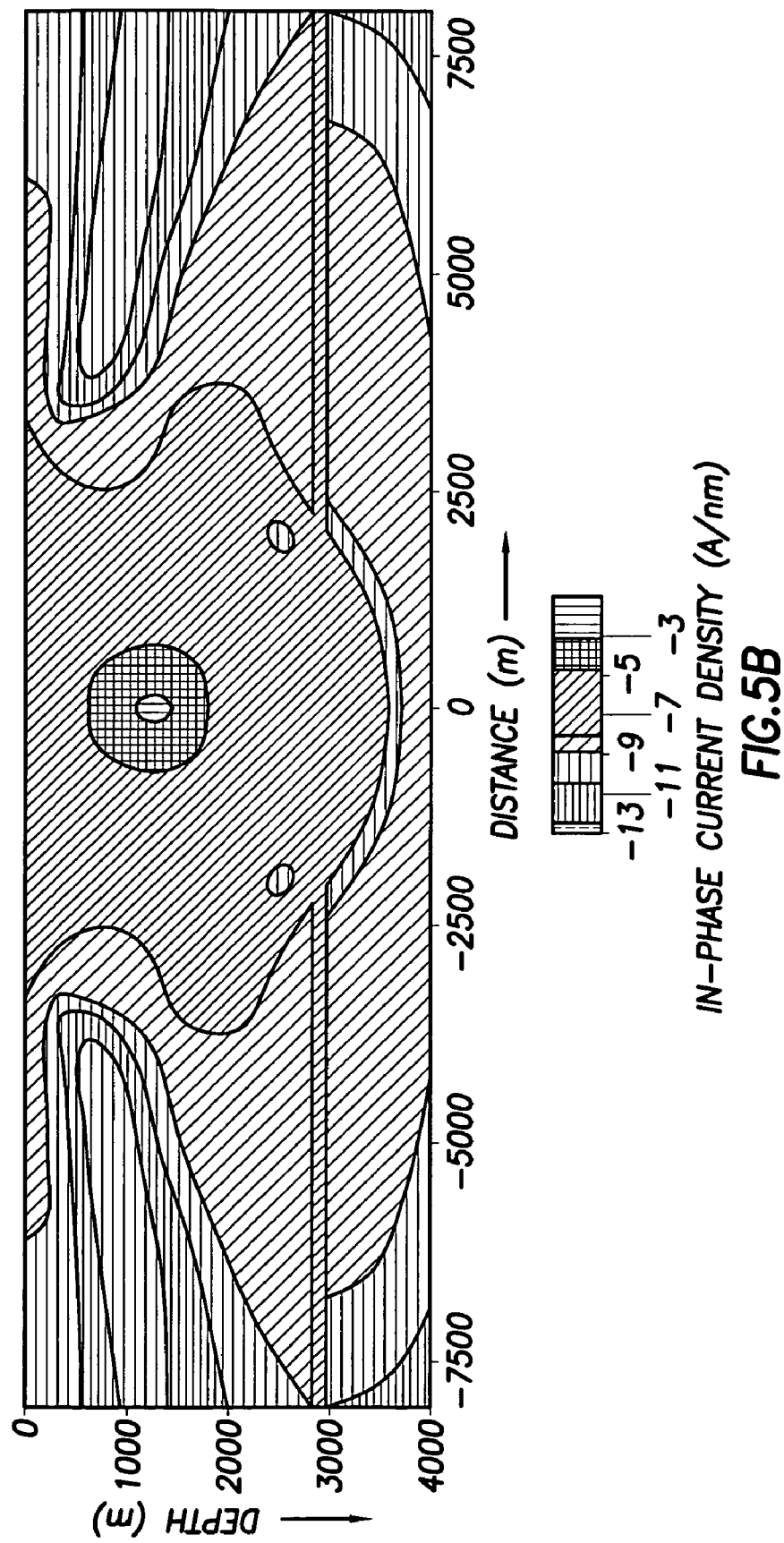

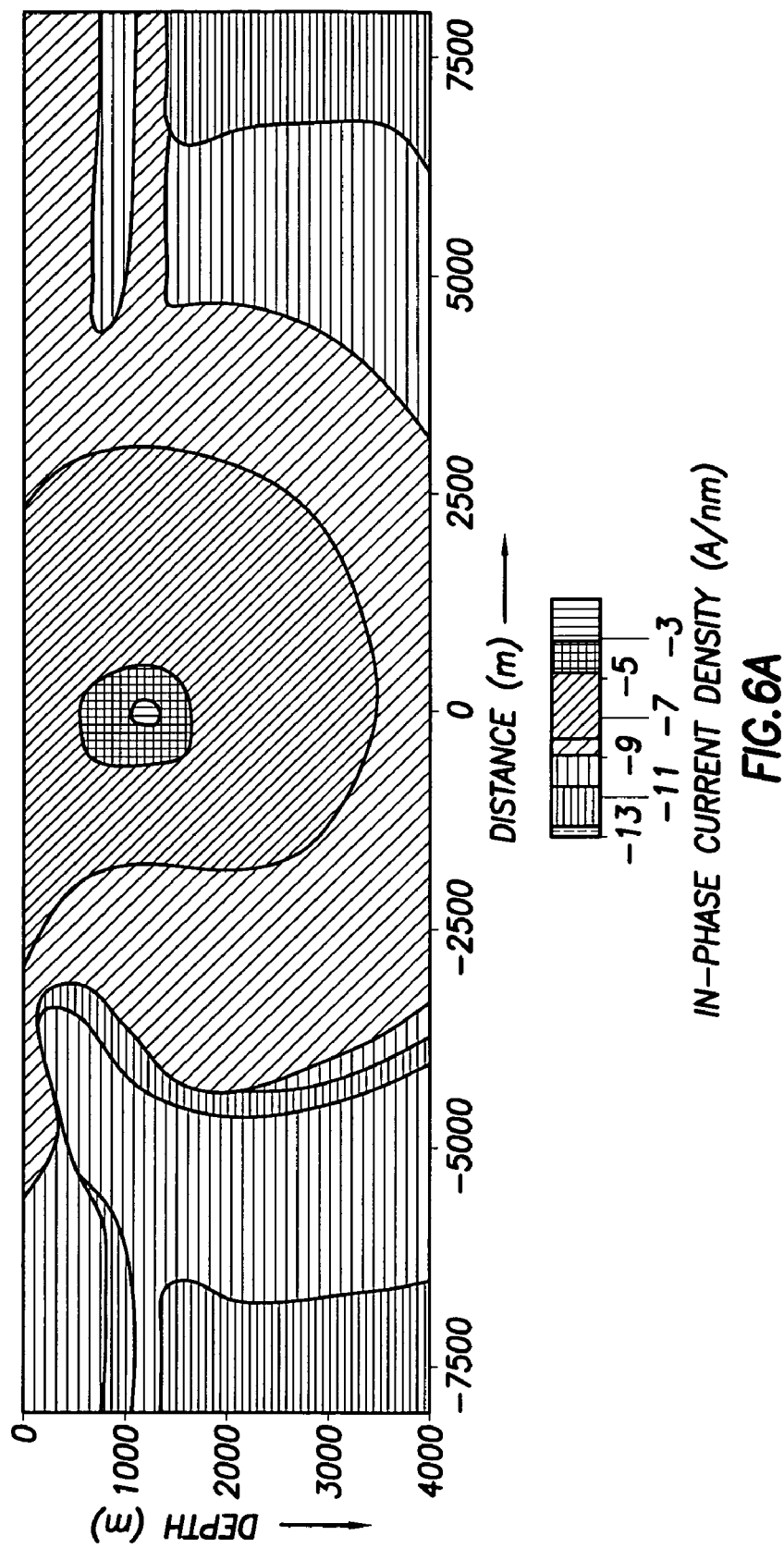

MULTI-COMPONENT FIELD SOURCES FOR SUBSEA EXPLORATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to subsea oil and gas exploration, particularly to methods and systems for electromagnetic surveys of subsea formations.

2. Background Art

Over the past several years, marine controlled-source electromagnetic (CSEM) survey has emerged as a useful tool for the delineation of hydrocarbon reservoirs. In this method a deep-towed electric dipole source is used to excite a low-frequency (~0.1-10 Hz) electromagnetic signal. This signal propagates through the seawater and subsurface and is perturbed by geologic variation to depths of a few kilometers. Spatially-distributed multi-component, seafloor receivers then record this electromagnetic energy and the data are interpreted in terms of resistivity variations. Of paramount significance is the resistive nature of hydrocarbon formations, which can produce detectable seafloor EM signals. Ideally, CSEM surveys consist of data recorded for many source-receiver offsets, several frequencies and at least two receiver components, inline (radial) and broadside (azimuthal) electric fields.

The standard deployment of CSEM involves a high power transmitter towed by a surface vessel. Two electrodes driven by a high AC current compose the transmitter antenna. The electrodes are kept at the same depth, thereby generating a horizontal electric field in the surrounding environment. The antenna, or horizontal dipole source, is typically towed within ~50 m of the seafloor, along which multi-component electromagnetic (EM) receivers have been deployed, while continually transmitting to produce currents both in the seawater as well as below the seafloor.

In general, the seafloor is more resistive than the seawater, and, therefore, the electromagnetic skin depth is longer in the Earth than in the seawater column. Because of this, electric field recorded by the receivers is dominated by signals that have diffused through the seafloor and therefore contain information on its structure. By studying the variation of the received signal as a function of source receiver separation and geometry, and the frequency of the transmitted signal, a multi-dimensional picture of the sub-surface resistivity distribution can be built up.

An alternative to the conventional horizontal source is the use of a source that can generate a vertical electric field. It has been reported that such a vertical field source can produce useful information when the returned signals picked up by the sea-bottom receivers are analyzed.

While the prior art methods have been shown to provide useful information about the subsea formations, there still exists a need for better electromagnetic sources for use in marine CSEM surveys.

SUMMARY OF INVENTION

One aspect of the invention relates to multi-component field sources for surveying subsea formations. A multi-component field source in accordance with one embodiment of the invention includes at least two electrodes having a direction of motion, wherein the at least two electrodes are configured to produce an electric dipole in an orientation that is not parallel to both the direction of motion of the electrodes and the seafloor.

Another aspect of the invention relates to methods for logging subsea formations. A method in accordance with one embodiment of the invention includes transmitting electromagnetic energy into the subsea formations with at least two electrodes having a direction of motion and configured to produce an electric dipole in an orientation that is not parallel to both the direction of motion of the electrodes and the seafloor; and receiving signals that comprise the electromagnetic energy that has traversed the subsea formations.

Other aspects and advantages of the invention will be apparent from the following description and the appended claims.

BRIEF DESCRIPTION OF DRAWINGS

FIGS. 5A & 5B show electric fields at various locations in the formations without and with a reservoir, respectively, using a conventional in-line source.

FIGS. 6A & 6B show electric fields at various locations in the formations without and with a reservoir, respectively, using a multi-component field source in accordance with one embodiment of the invention.

DETAILED DESCRIPTION

Embodiments of the invention relate to methods and systems for generating, in the marine environment, a composite or multi-component field from two or more electrodes driven by high power AC currents. The composite or multi-component fields may comprise fields in two or more orientations, which may be vertical and horizontal, or two different directions in a horizontal plane, or the like. The composite or multi-component fields may comprise multiple electrical fields, multiple magnetic fields, or a combination of electrical and magnetic fields. The sources that are capable of generating multi-component fields are referred to as "multi-component field" sources.

Figure 1:
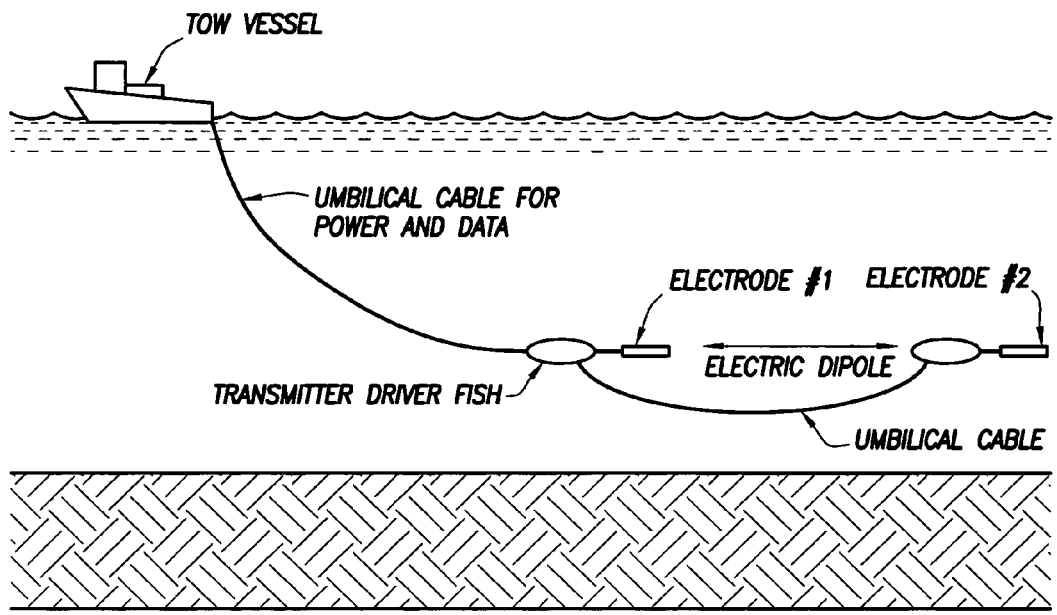
FIG. 1 shows a prior art marine survey source comprising an in-line electric dipole.

FIG. 1 shows a conventional deployment of an electric dipole transmitter that is kept horizontal and typically about 50 m from the seafloor. Both electrodes #1 and #2 are kept near the bottom by hydrodynamically controlling the position of the transmitter driver fish, from which the electrodes are deployed. Both electrodes #1 and #2 are driven by a transmitter that is connected to the electrodes via an umbilical cable, which also functions as a data transmission cable. As noted above, such an arrangement will produce an electric field dipole in the horizontal orientation, i.e., in-line electric dipole.

Figure 2:
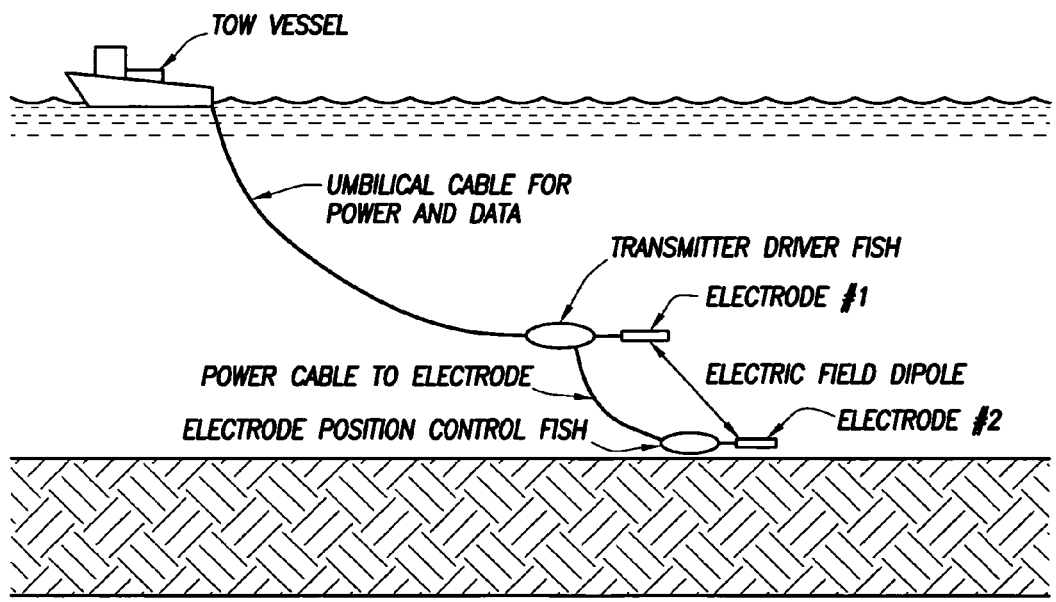
FIG. 2 shows a multi-component field source in accordance with one embodiment of the invention.

FIG. 2 shows, in accordance with one embodiment of the invention, an assembly of an electric dipole transmitter. As shown, the two electrodes #1 and #2 are kept in an alignment that is at an angle (e.g., 45°) relative to the seafloor. Electrode #2 is kept near the bottom by hydrodynamically controlling the positioning fish from which the electrode is deployed. Such an arrangement will produce an electric dipole that is at an angle (e.g., 45°) relative to the seafloor (or sea surface). While this particular embodiment shows a 45° electric dipole, one of ordinary skill in the art would appreciate that other angles may also be used without departing from the scope of the invention. In addition, electrode #2 need not be lower than electrode #1. One of ordinary skill in the art would appreciate that electrode #2 may also be maintained at a level higher than electrode #1 to form an angled electric dipole.

Such an angled dipole may be treated as a combination (vector sum) of a horizontal dipole and a vertical dipole. Thus, an angled dipole in accordance with embodiments of the invention can provide information that is traditionally logged with a horizontal electric dipole. In addition, the angle dipole of the invention can provide log data from its vertical electric dipole component. The advantages of having log data from such an angled electric dipole will be described later.

Figure 3:
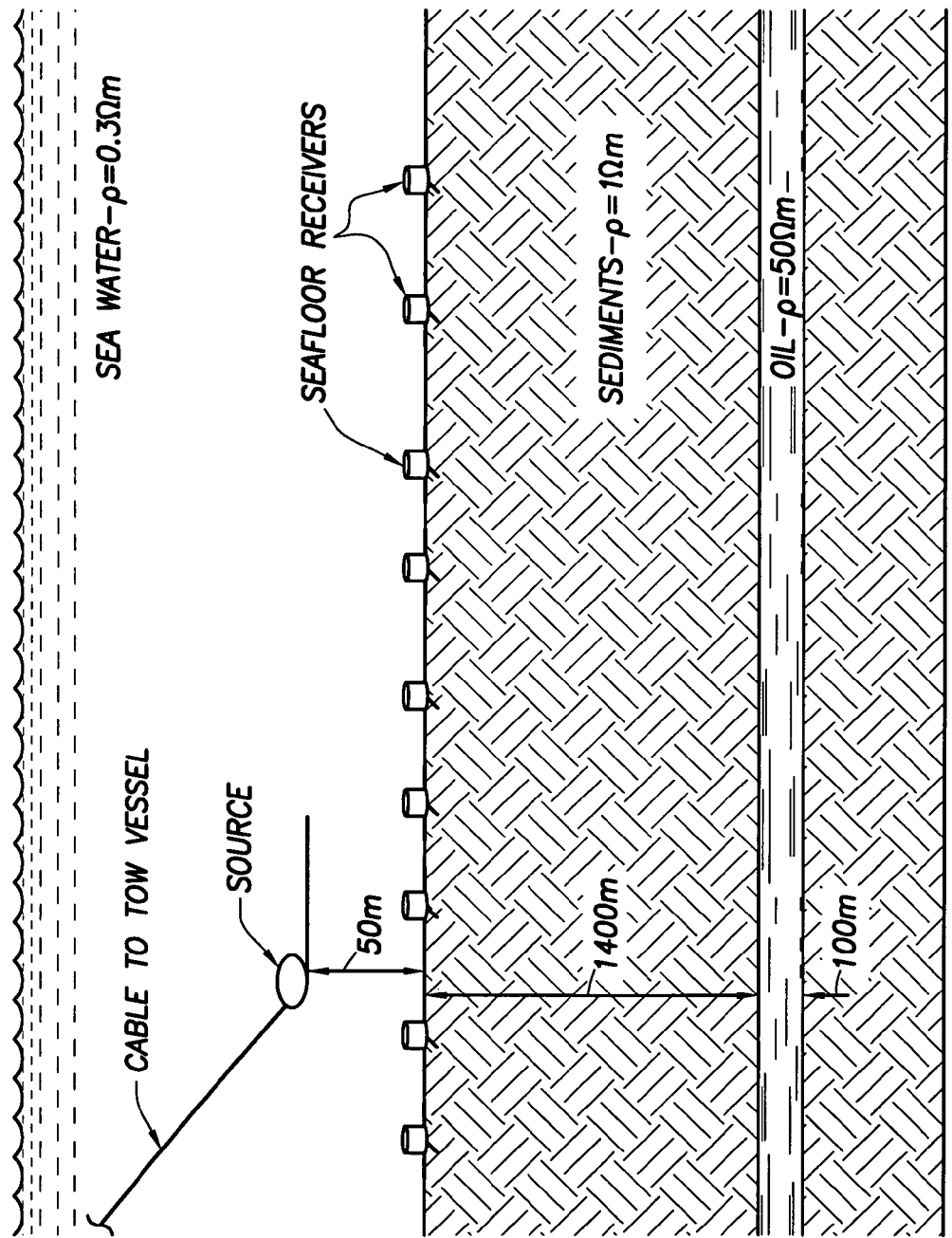
FIG. 3 shows a model for testing a method in accordance with one embodiment of the invention.

Once the log data are available, various methods known in the art may be used to derive the formation properties. Standard data processing typically involves normalizing the measured data by fields that would theoretically exist over a layered seafloor background without a target reservoir. To illustrate a method of data processing, a layered 1D model with a reservoir as shown in FIG. 3 may be used to calculate the synthetic data. As shown, a reservoir with a thickness of 100 m is located 1400 m below the seafloor. The sediment layers of the seafloor have a resistivity of 1 Ωm, the sea water has a resistivity of 0.3 Ωm, and the reservoir layer has a resistivity of 50 Ωm. Note that the reservoir depth of 1.4 km in this model (FIG. 3) makes this a difficult target to detect. As shown in FIG. 3, the measurement data are acquired using a source located at least 50 m above the seafloor and a series of receivers located on the seafloor.

The measurement or synthetic data may be normalized with the calculated results that are obtained assuming the reservoir is not present. To demonstrate the enhanced sensing capability of the angled source, the anomalies generated with an angled source will be compared with those generated with a standard horizontal source. In both cases, the source length is 200 m long, has a current of 250 amps, and maintains a minimum distance above the seafloor of 50 m.

Figure 4A:
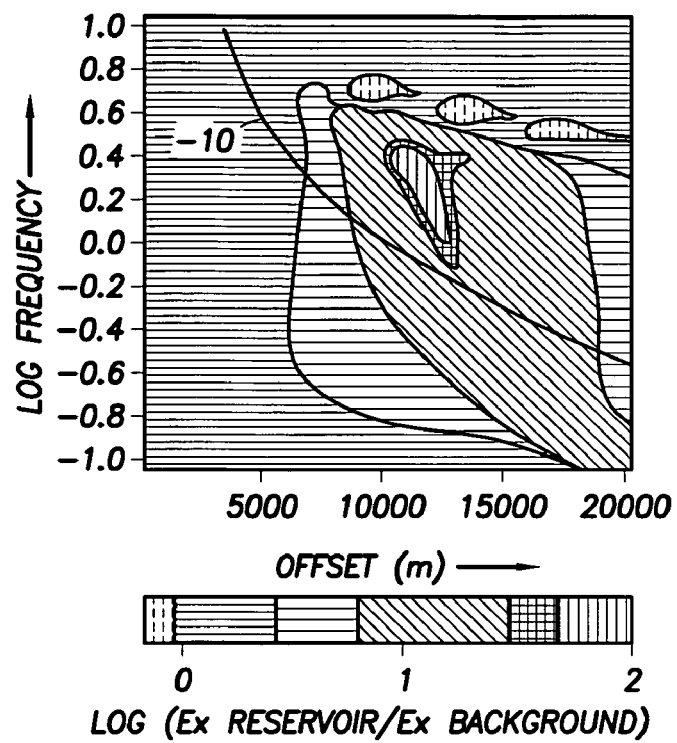
FIGS. 4A-4C show simulation of results from a conventional in-line source.
Figure 4D:
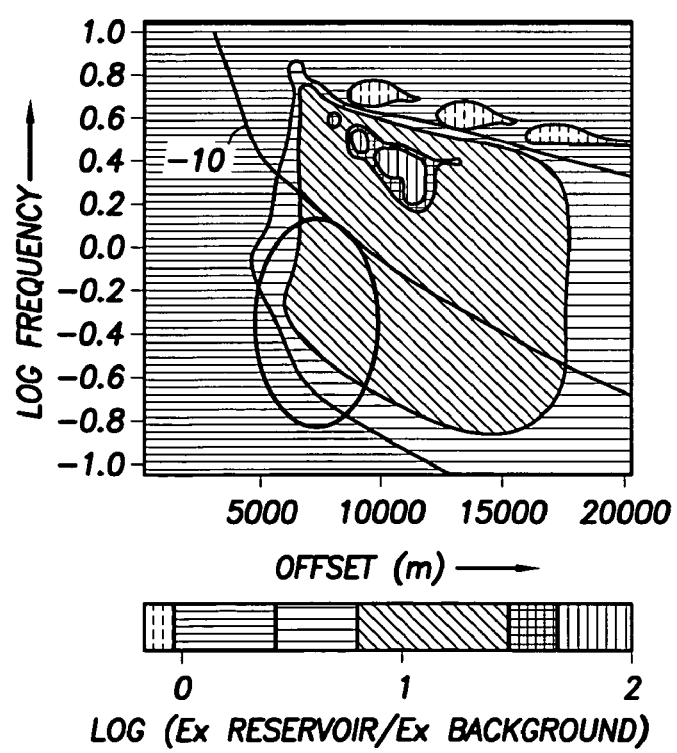
FIGS. 4D-4F show simulation results from a multi-component field source in accordance with one embodiment of the invention.
Figure 4B:
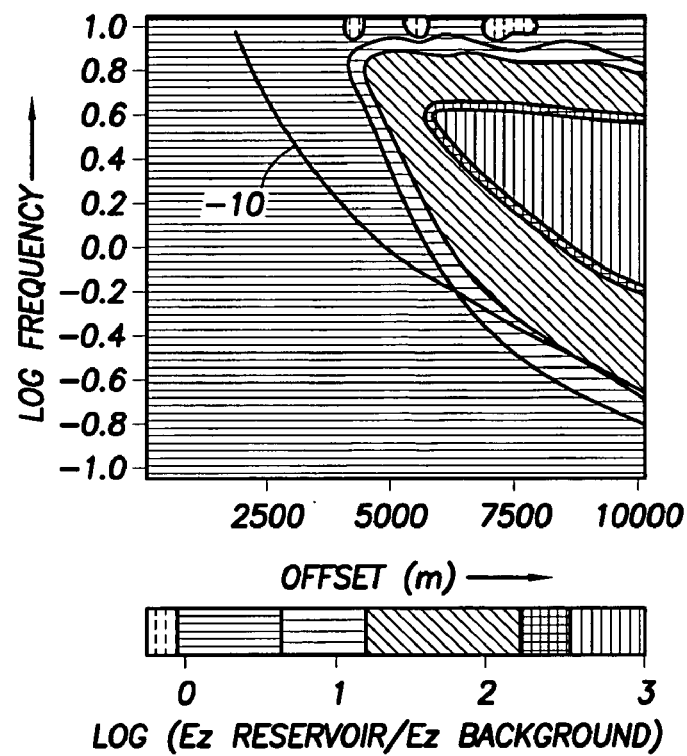
Figure 4E:
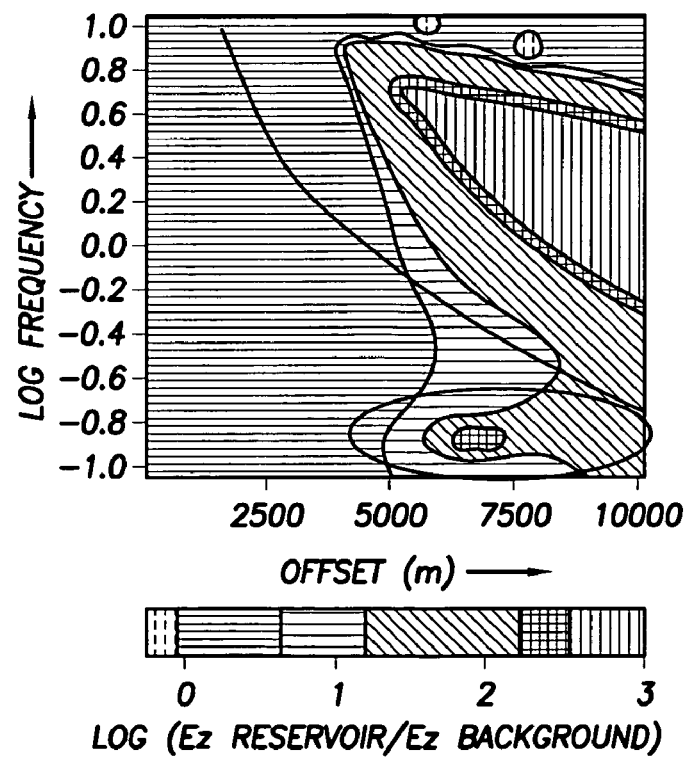
Figure 4C:
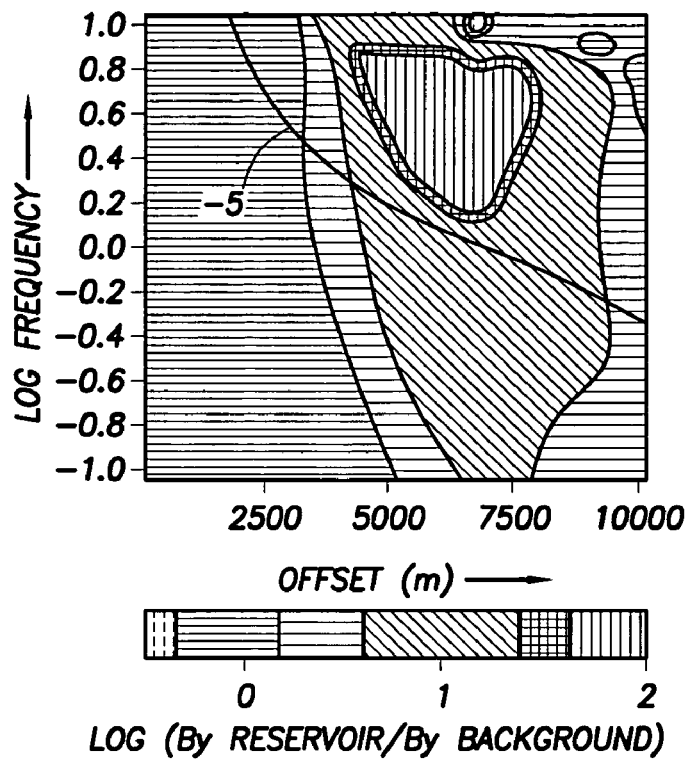
Figure 4F:
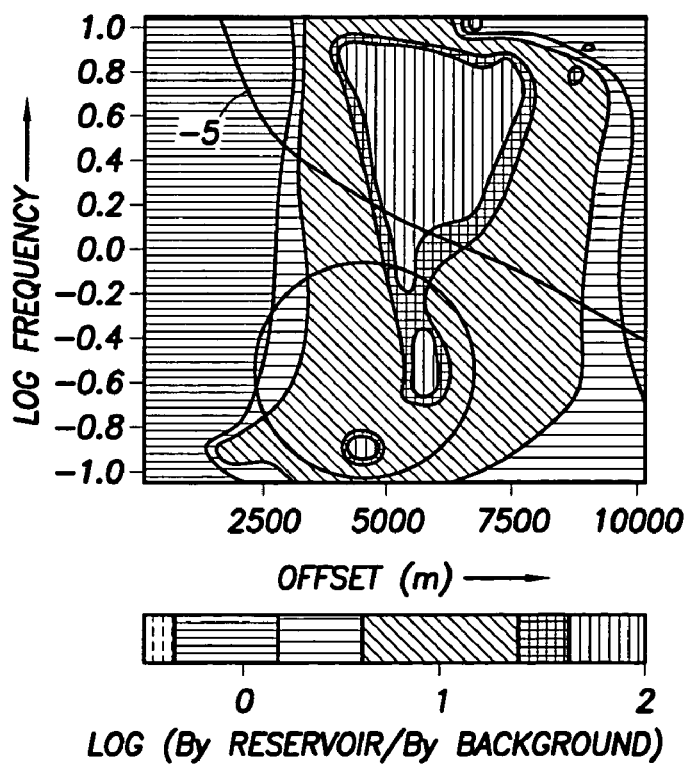

FIGS. 4A-4F show the resulting normalized anomalies on a log scale for different frequencies and transmitter-receiver separations. FIGS. 4A-4C show the anomalies generated by a standard horizontal source, while FIGS. 4D-4F show the results for the angled source, where the angle is 45 degrees. The white ovals in FIGS. 4D-4F indicate frequency-offset combinations where the angled source offers increased reservoir sensitivity as compared with the horizontal source. The fact that the angled source provides enhanced sensitivity at shorter transmitter-receiver offsets is beneficial because this occurs in regions of greater signal strength, thus leading to better signal-to-noise characteristics in the data.

Figure 5A:
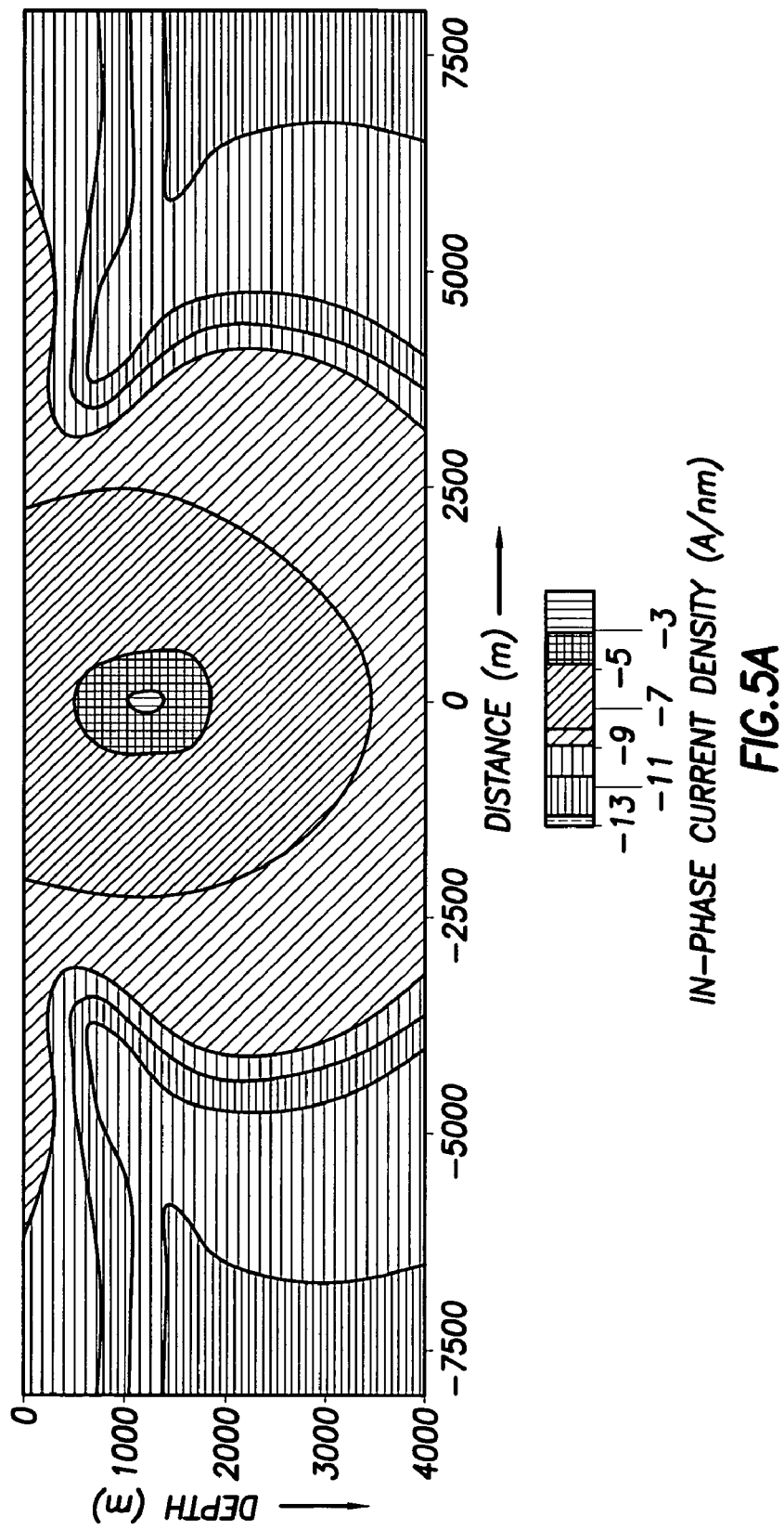

The physics behind the sensitivity enhancement can at least be partially explained by the current patterns that are generated by the different source polarizations. For example, FIGS. 5A and 5B show the in-phase current flow patterns at a frequency of 0.4 Hz for a horizontal source over the models without (FIG. 5A) and with (FIG. 5B) a reservoir. The source center is located at x=0 m, z=1250 m. In these Figures, the arrows show the directions of current flows at the given points in space. Note that at a distance of 2500 to 5000 m away from the source at a depth of 1400 m along the seafloor, the current directions and amplitudes are approximately the same in both cases, i.e., with and without the reservoir. Therefore, these results indicate that the horizontal source will not be able to detect the presence of the reservoir at a depth of 1400 m.

Figure 6B:
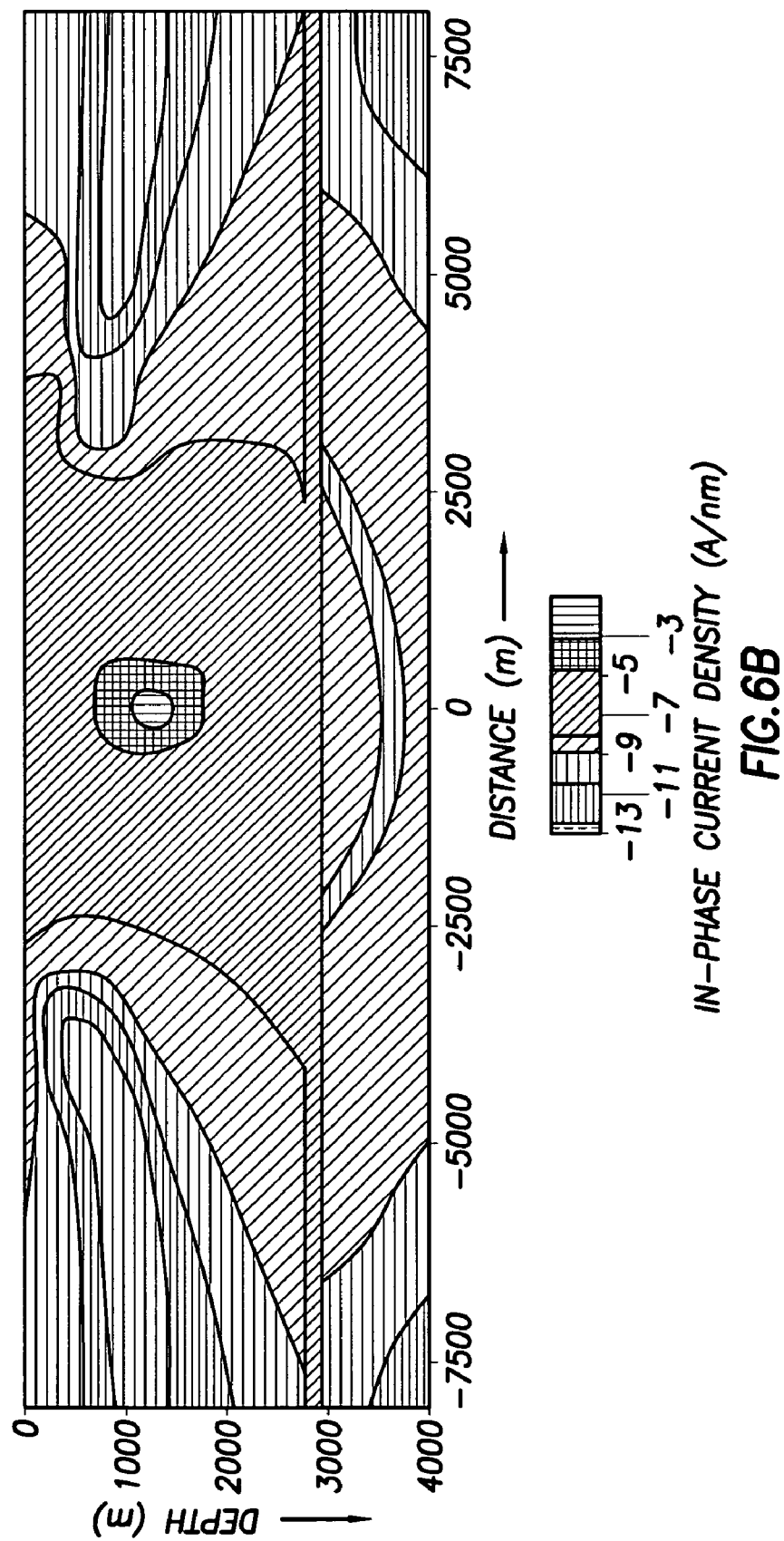

Similar analyses for the 45-degree angled source results are shown in FIGS. 6A (without a reservoir) and 6B (with a reservoir). The results from the model without the reservoir (FIG. 6A) indicate primarily vertical current flows at these distances (around 2500 to 5000 m) from the source and at a depth of 1400 m. Because the current flows are primarily vertical in this case, the measured horizontal fields will be relatively small. On the other hand, the fields generated when the reservoir is present (FIG. 6B) are distorted and certain horizontal components are discernable. These relatively large horizontal components result in relatively large measured responses, e.g., the anomalies shown in the white circles in FIGS. 4D-4F.

The above results show that the vertical electric dipole can provide added sensitivities in the detection of hydrocarbon reservoirs. In fact, similar advantages may be achieved with any added electric dipole that is not in the same orientation as the conventional electric dipole. In a simple case, the added electric dipole may lie in the same horizontal plane as the conventional horizontal electric dipole, but at an angle with respect to the conventional, in-line, horizontal electric dipole. That is, the added electric dipole and the conventional electric dipole form crossed dipoles in the horizontal plane.

Figure 7:
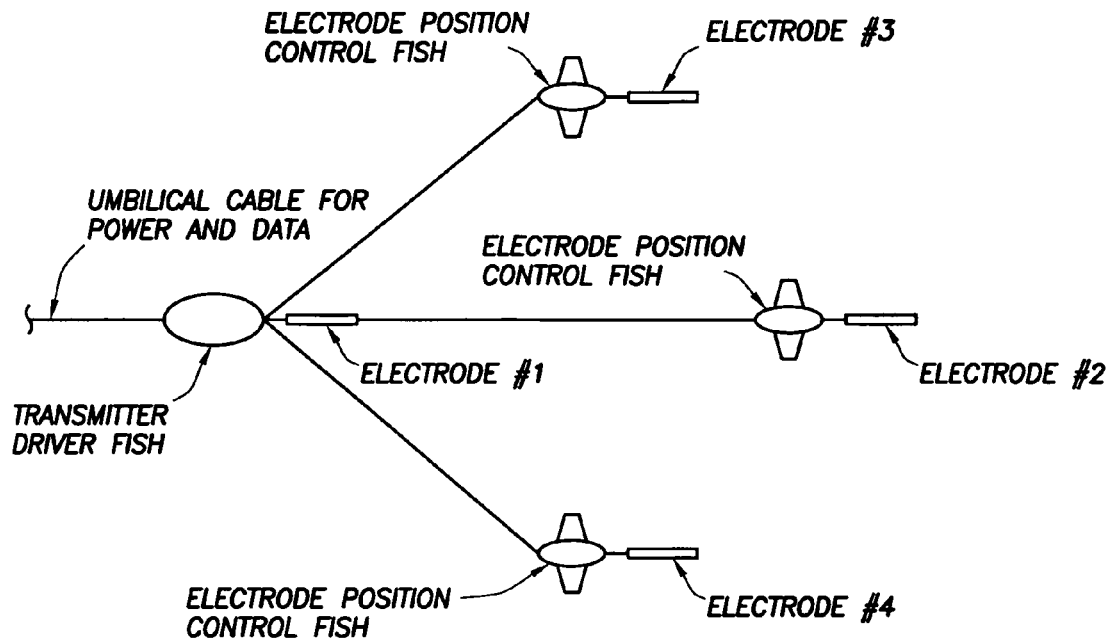
FIG. 7 shows a crossed-dipole field source in accordance with one embodiment of the invention.

FIG. 7 shows a view from above of an arrangement of four electrodes that can generate cross electric dipoles. Electrodes #1 and #2 may be on the same horizontal plane as in the arrangement shown in FIG. 1, or electrodes #1 and #2 may be slanted as in the arrangement shown in FIG. 2. For simplicity, the following description assumes that these electrodes #1 and #2 are on a horizontal plane, thus creating the standard in-line polarization of the electric field typically used in the prior art surveys.

As shown in FIG. 7, two additional electrodes #3 and #4 are towed from the same transmitter driver fish to form an electric dipole that is in a different orientation from that of electrodes #1 and #2. Electrodes #3 and #4 are positioned at an angle and off-line from the transmitter driver fish. Electrodes #3 and #4 may be on a horizontal plane or slanted relative to the horizontal plane. Furthermore, electrodes #3 and #4 may be on a same or different horizontal plane as compared to electrodes #1 and #2. The positions of these electrodes may be controlled using the electrode position control fish. Note that while these four electrodes are connected to the same transmitter driver fish, one of ordinary skill in the art would appreciate that more than one transmitter driver fish may be used without departing from the scope of the invention. For example, electrodes #1 and #2 may be connected to a transmitter driver fish, while electrodes #3 and #4 are connected to another transmitter driver fish.

Figure 8:
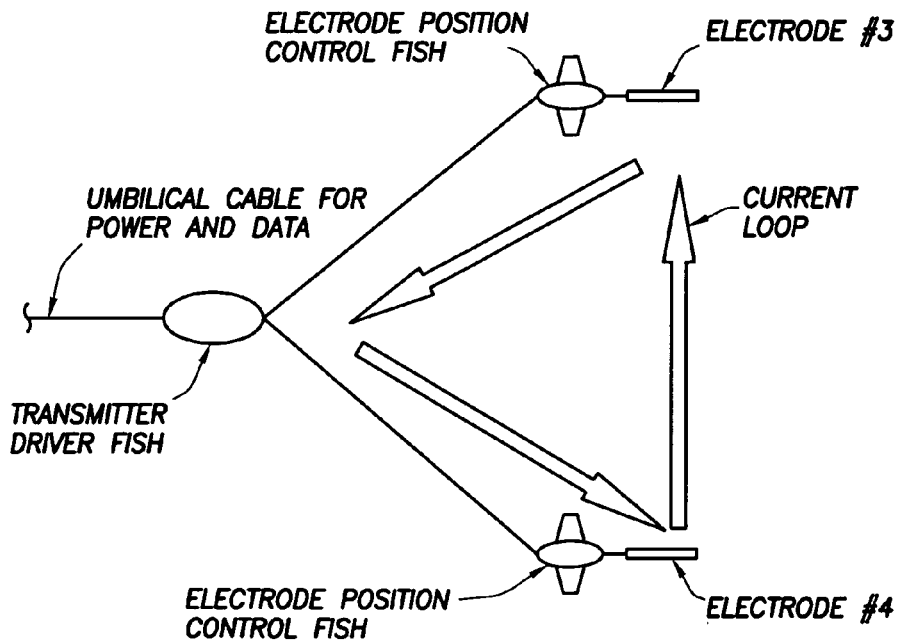
FIG. 8 shows a diagram illustrating current loop of a crossed-dipole field source in accordance with one embodiment of the invention.

As shown in FIG. 8, when a current is injected into seawater from Electrode #4 and returns to Electrode #3, a transverse electric field component is generated. The arrows in FIG. 8 show the directions of the current loop. One of ordinary skill in the art would appreciate that the current may also be injected from electrode #3 into the seawater and return to electrode #4. In either case, a transverse electric field is generated between electrodes #3 and #4. A "transverse" electric field as used herein means that the electric dipole is not in the same orientation as the "in-line" electric dipole generated by the conventional configuration of electrodes #1 and #2.

The "in-line" and "transverse" electric field antennas may be operated sequentially or simultaneously. If operated sequentially, the transmitter driver fish would alternately direct the AC currents between the electrode pairs, i.e. first to Electrodes #1 and #2, and then to Electrodes #3 and #4. The detected signals recorded by the receivers are time multiplexed in a similar manner such that the two polarizations can be recovered later by synchronizing the time of acquisition. If the "in-line" and "transverse" electric field antennas are operated simultaneously, the transmitter driver fish would create two AC currents at distinct frequencies, directing one frequency to each pair of electrodes. The detected signals recorded by the receivers would then be separated by synchronous detection of the two known frequencies.

A related feature of the crossed dipole antenna configuration described above is that a magnetic dipole is generated at the same time as the electric dipole, as shown in FIG. 8. FIG. 8 shows only the transverse electrodes. The currents are shown by the arrows: flowing through the insulated antenna conductor from the transmitter driver fish to Electrode #4, through the sea water to Electrode #3, and then returning to the transmitter driver fish through another insulated antenna conductor. This current loop generates a magnetic dipole simultaneous with the transverse electric dipole. The magnetic dipole makes it possible to have enhanced imaging and anisotropy detection.

Figure 9:
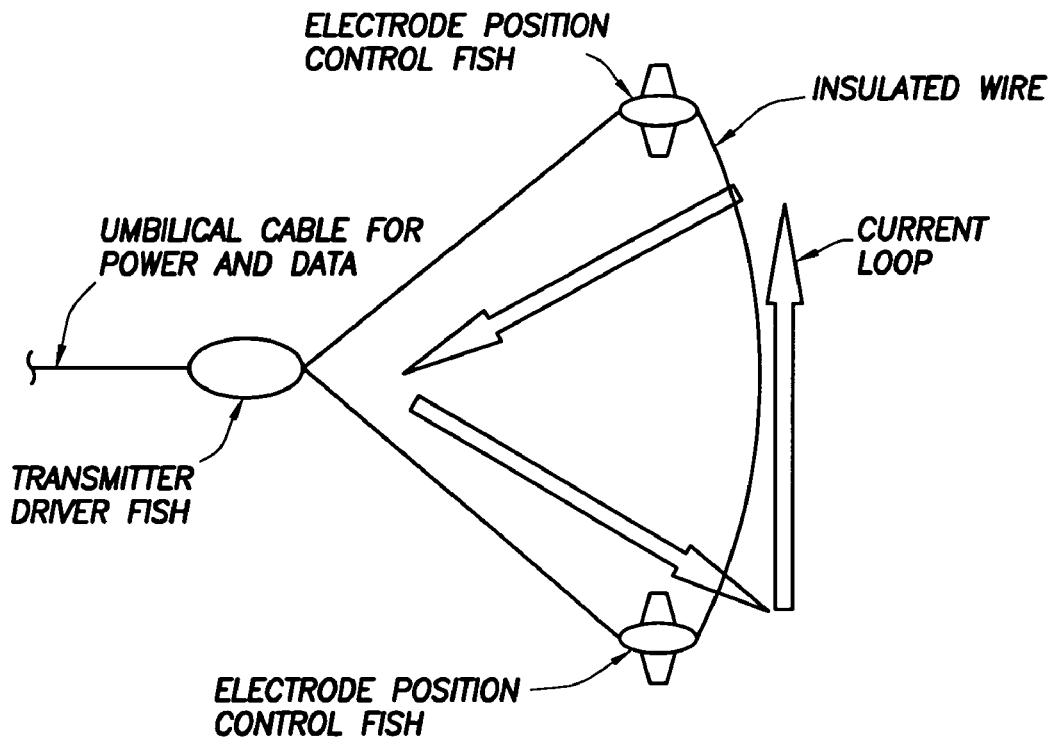
FIG. 9 shows a crossed-dipole field source for producing a cross magnetic field in accordance with one embodiment of the invention.

In accordance with some embodiments of the invention, crossed dipole antennas may also be used to generate magnetic dipoles, without generating any electric dipole. For example, FIG. 9 shows a pair of electrodes (corresponding to electrodes #3 and #4 in FIG. 7) attached to a transmitter driver fish. An insulated conductor wire connects electrode #3 to electrode #4. When a current is injected from electrode #3 to electrode #4 (or vice versa), the current flows through this insulated conductor wire and no electric current flows in the seawater. Such current flows are illustrated by arrows in FIG. 9. However, magnetic fields are generated when currents flow through the insulated conductor wires.

The advantages of measurements using crossed dipole electric fields includes improved three-dimensional imaging capabilities as well as the ability to measure anisotropy. The following simulation studies illustrate the advantages of embodiments of the invention.

Figure 10:
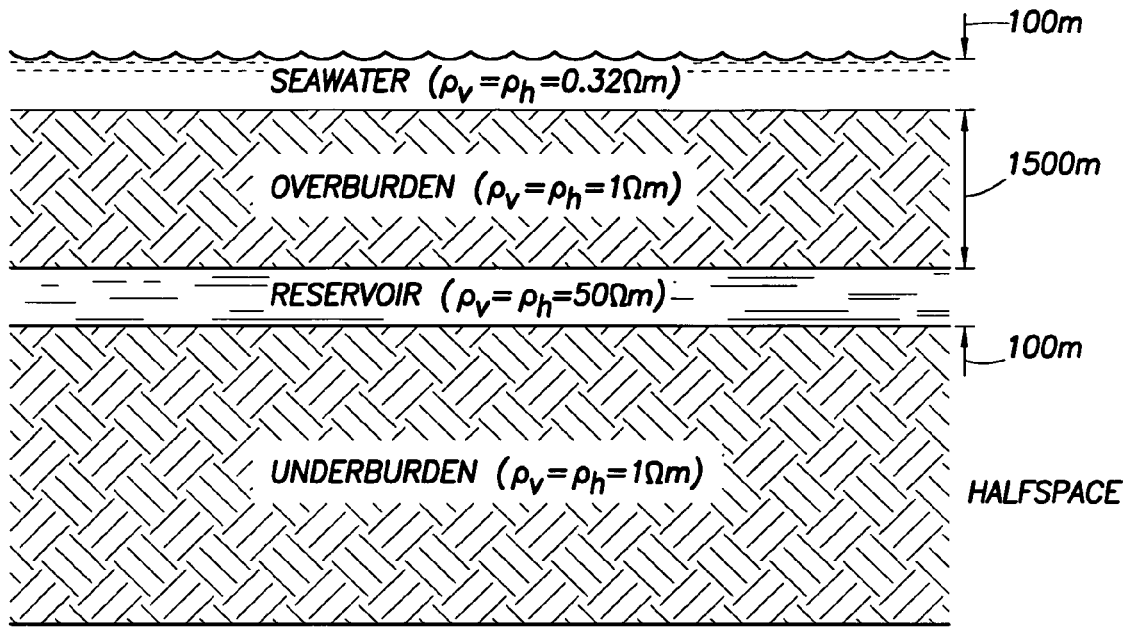
FIG. 10 shows a formation model used in the simulation of the cross dipole results.

FIG. 10 shows a one-dimensional formation model used in the simulation studies. As shown, the model comprises a seawater layer (100 m deep; resistivity=0.32 Ωm), an overburden (1,500 m thick; resistivity=1 Ωm), a reservoir (100 m thick; resistivity=50 Ωm), and an underburden layer (resistivity=1 Ωm).

Figure 11:
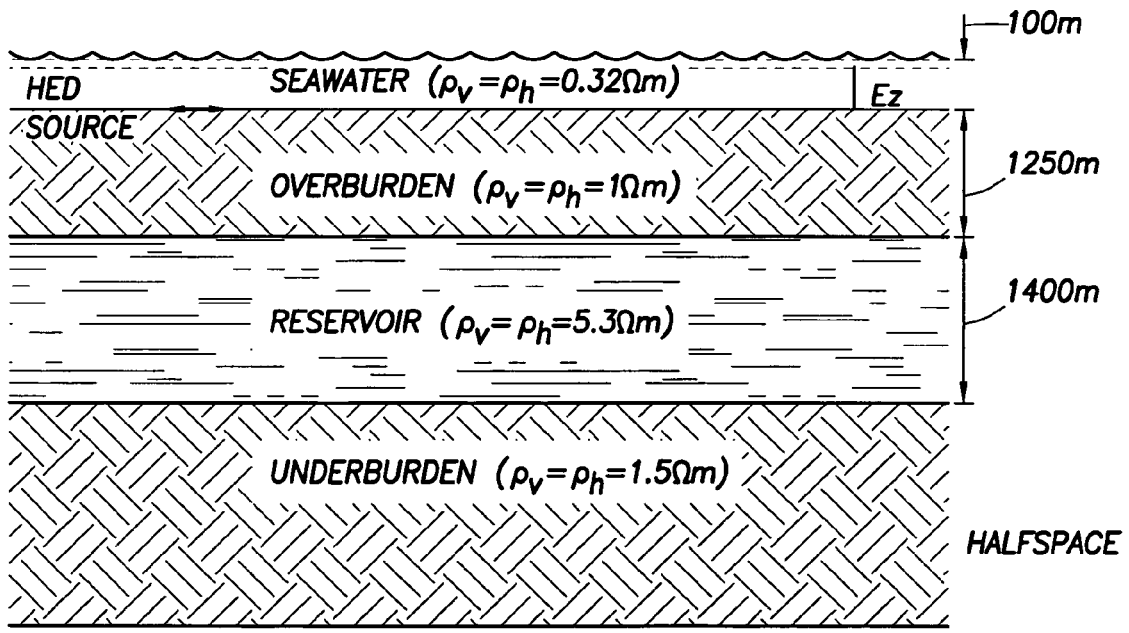
FIG. 11 shows results from inversion of data collected using a conventional in-line dipole source.

FIG. 11 shows the formation inverted using data collected with a conventional in-line source. The "in-line" electric dipole source produces an electric dipole in the x direction. This electric dipole has an associated electric field ($E_z$) in the z direction (downward). Note that the reservoir inverted with this data set is too thick (1400 m) and has a lower resistivity (5.3 Ωm) than the true model (100 m and 50 Ωm). In addition, there are many other models that would fit the data equally well. This is not surprising in view of the fact that the presence of a reservoir at such a depth does not produce any significant perturbation of the electric fields generated with an "in-line" source as discussed above with reference to FIGS. 5A and 5B.

Figure 12:
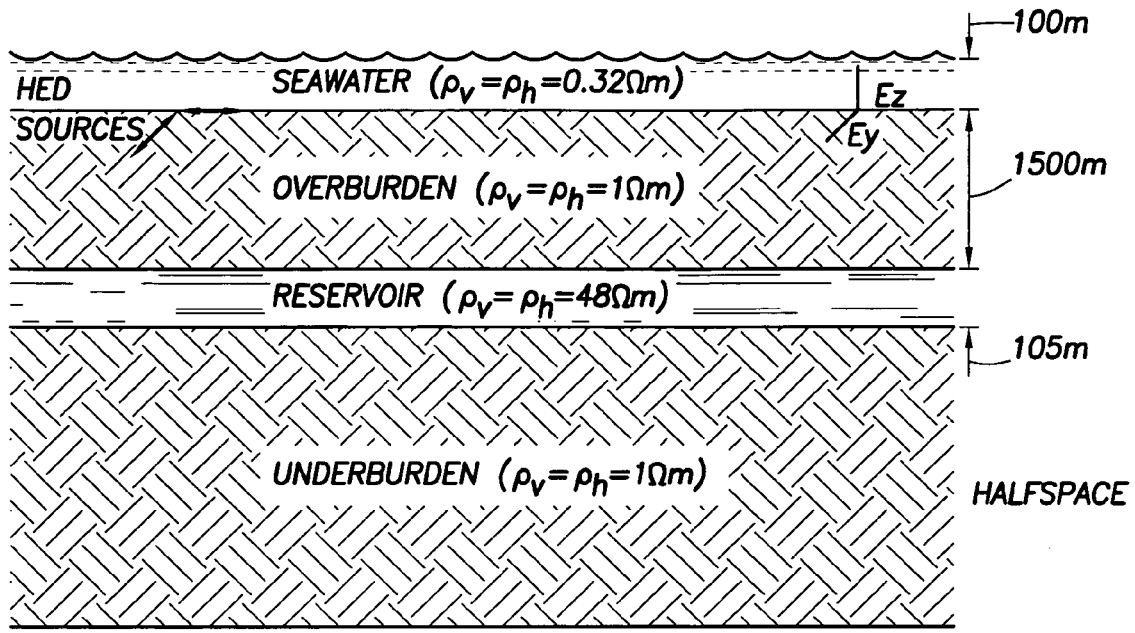
FIG. 12 shows results from inversion of data collected using a crossed-dipole electric field source in accordance with one embodiment of the invention.

FIG. 12 shows the model inverted using the $E_z$ data collected with the x-directed source (in-line source) and the $E_y$ data collected with a y-directed source (a cross electric dipole source). This inversion produces a reservoir having a thickness of 105 m and a resistivity of 48 Ωm, these values are very close to the true values, 100 m and 50 Ωm. It is clear that the model inverted using multi-component field data collected with sources of different polarization is significantly more accurate than that inverted with only the in-line electric dipole data. In addition, the non-uniqueness of the inversion result is significantly reduced.

Figure 13:
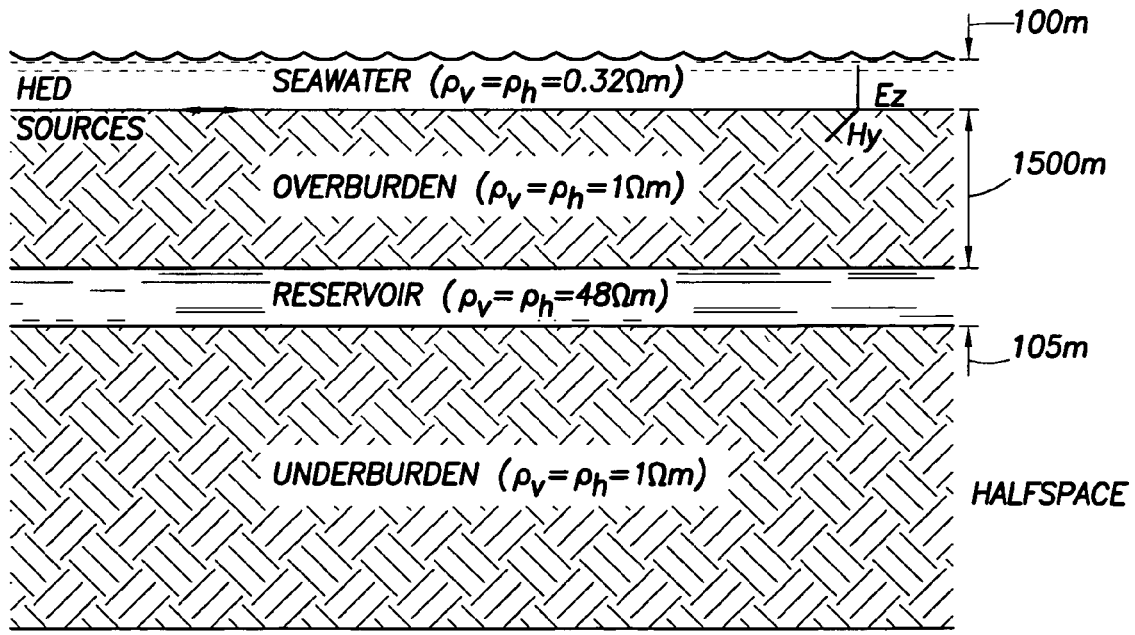
FIG. 13 shows results from inversion of data collected using a crossed-dipole electric and magnetic field source in accordance with one embodiment of the invention.

FIG. 13 shows the model inverted using the $E_z$ data and the $H_y$ (magnetic dipole in the y direction) data collected with an x-directed source (in-line source). This inversion produces a reservoir having a thickness of 105 m and a resistivity of 48 Ωm, these values are also very close to the true values, 100 m and 50 Ωm. It is clear that the model inverted using multiple component data is significantly more accurate than that inverted with only the in-line electric dipole data. In addition, the non-uniqueness of the inversion result is significantly reduced.

The above examples clearly show that multi-component field data collected with a source in accordance with embodiments of the invention can produce much more reliable formation models. The multi-component field data could comprise multiple electric field data, multiple magnetic field data, or a combination of electric field and magnetic field data. "Multi-component field" data as used herein refer to data collected using electrical or magnetic fields that are oriented in more than one direction. Such multi-directional electric fields and/or magnetic fields may be generated using sources that have an angled dipoles (such as that shown in FIG. 2), crossed dipoles (such as that shown in FIG. 7 or 8), or a combination of angled and crossed dipoles.

Figure 14:
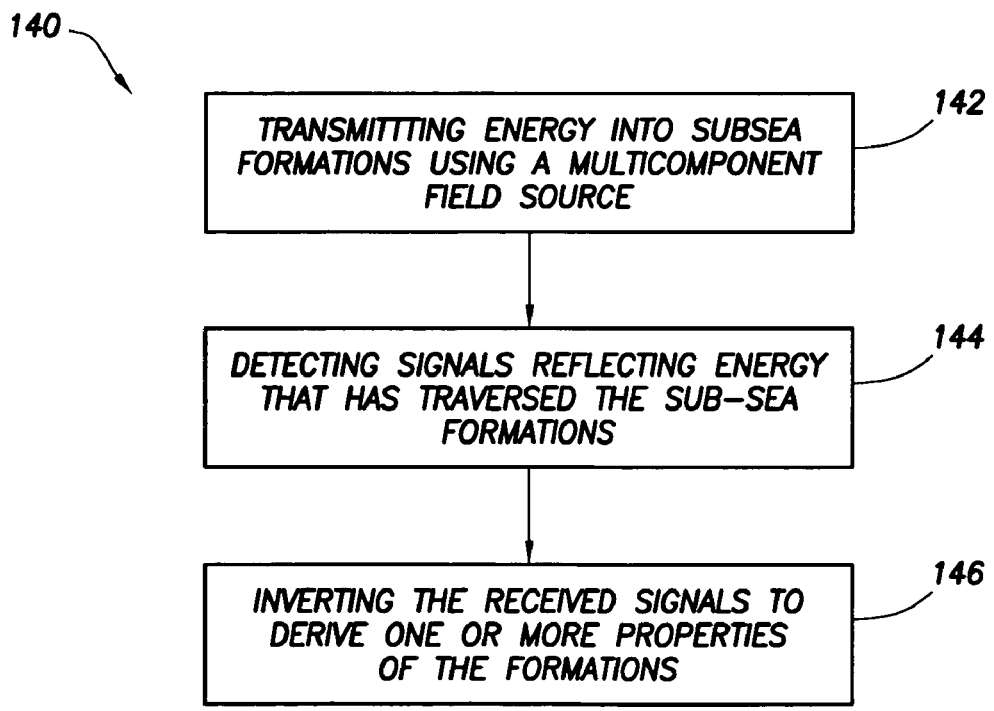
FIG. 14 shows a method of logging subsea formations in accordance with one embodiment of the invention.

Some embodiments of the invention relate to methods of logging the subsea formations using angled and/or cross-dipole sources as described above. FIG. 14 shows a method 140 in accordance with one embodiment of the invention. As shown, the method 140 includes the step of transmitting energy (e.g., electromagnetic energy) into the subsea formations using a multi-component field source (step 142). The multi-component field source may be an angled source, a crossed dipole source, a combination of angled and cross dipole source, or the like. The multi-component fields may be multiple electric fields, multiple magnetic fields, or a combination of multiple electric and magnetic fields, which are oriented in more than one direction.

The energy emitted from the multi-component field source will traverse the subsea formations and return to the receivers, which may be an array of receivers disposed on the seafloor, or any other arrangement of receivers known in the art. These receivers will detect signals corresponding to the returned electromagnetic energy (step 144). As noted above, the multi-component field source may be operated in time-multiplexed or frequency-multiplexed mode. The detected signals may be stored in accordance with the mode of operation.

The data thus collected are then used to invert formation properties, such as resistivity, reservoir thickness, etc. (step 146). Various inversion methods are known in the art and methods of the instant invention are not limited by the inversion methods used. For example, one may use a formation model to analyze the collected data. In this approach, a formation model (such a that shown in FIG. 10) may be constructed based on other log data available for the formations at that location. Then, expected signals may be calculated based on the formation model and compared with the actual data. The parameters of the formation model is then adjusted based on the difference between the calculated and actual data. The calculation and comparison are repeated until the computed data closely resemble the actual data.

Advantages of embodiments of the invention may include one or more of the following. Embodiments of the invention provide multi-component sources that can provide more varied data for more accurate analysis of the formation properties. The multi-component sources in accordance with embodiments of the invention are flexible in their positioning; they may comprise an angled source, a cross-dipole source, or a combination of those types. In addition, the multi-components may comprise a combination of multiple electrical components, multiple magnetic components, or a combination of electrical and magnetic components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multi-component field source for surveying subterranean formations, comprising:
   at least two electrodes having a direction of motion, wherein each of the two electrodes is associated with a corresponding different position control fish, wherein a position of each of the position control fish is dynamically controllable to control a position of a corresponding one of the electrodes, wherein the at least two electrodes are configured to produce an electric dipole in an orientation that is not substantially parallel to both the direction of motion of the electrodes and a seafloor, and wherein the electric dipole has at least a first component in a first direction and a second component in a second direction, and wherein the at least two electrodes are configured to transmit electromagnetic energy into the subterranean formations to cause signals to traverse through the subterranean formations underneath the seafloor for receipt by a receiver,
   wherein the first component is a vertical component and the second component is a horizontal component.

2. The multi-component field source of claim 1, wherein the vertical component and the horizontal component have substantially equal magnitudes.

3. The multi-component field source of claim 1 wherein the at least two electrodes are connected by a cable to a vessel.

4. The multi-component field source of claim 2, wherein the orientation is angled with respect to the seafloor.

5. An apparatus to survey the subterranean formations, comprising:
   the multi-component field source of claim 1; and
   a tow cable to tow the multi-component field source through sea water in the direction of motion.

6. The apparatus of claim 5, further comprising a system to process data of the signals to generate a representation of the subterranean formations.

7. The multi-component field source of claim 1, wherein each of the position control fish includes wings to provide positioning in a body of water.

8. A multi-component field source for surveying subterranean formations, comprising:
   at least two electrodes having a direction of motion, wherein each of the two electrodes is associated with a corresponding different position control fish, wherein a position of each of the position control fish is dynamically controllable to control a position of a corresponding one of the electrodes, wherein the at least two electrodes are configured to produce an electric dipole in an orientation that is not substantially parallel to both the direction of motion of the electrodes and a seafloor, and wherein the electric dipole has at least a first component in a first direction and a second component in a second direction, and wherein the at least two electrodes are configured to transmit electromagnetic energy into the subterranean formations to cause signals to traverse through the subterranean formations underneath the seafloor for receipt by a receiver,
   wherein the at least two electrodes comprise two pairs of electrodes configured to produce two electric dipoles in different orientations.

9. The multi-component field source of claim 8, wherein one of the two electric dipoles is on a horizontal plane.

10. The multi-component field source of claim 8, wherein one of the two electric dipoles is in a direction that forms an angle with respect to a horizontal plane, the horizontal plane substantially parallel to the seafloor.

11. A multi-component field source for surveying subterranean formations, comprising:
    at least two electrodes having a direction of motion, wherein each of the two electrodes is associated with a corresponding different position control fish, wherein a position of each of the position control fish is dynamically controllable to control a position of a corresponding one of the electrodes, wherein the at least two electrodes are configured to produce a dipole in an orientation that is not substantially parallel to both the direction of motion of the electrodes and a seafloor, and wherein the dipole has at least a first component in a first direction and a second component in a second direction, and wherein the at least two electrodes are configured to transmit electromagnetic energy into the subterranean formations to cause signals to traverse through the subterranean formations underneath the seafloor for receipt by a receiver,
    wherein the at least two electrodes comprise two pairs of electrodes configured to produce two magnetic dipoles in different orientations.

12. A multi-component field source for surveying subterranean formations, comprising:
    at least two electrodes having a direction of motion, wherein each of the two electrodes is associated with a corresponding different position control fish, wherein a position of each of the position control fish is dynamically controllable to control a position of a corresponding one of the electrodes, wherein the at least two electrodes are configured to produce an electric dipole in an orientation that is not substantially parallel to both the direction of motion of the electrodes and a seafloor, and wherein the electric dipole has at least a first component in a first direction and a second component in a second direction, and wherein the at least two electrodes are configured to transmit electromagnetic energy into the subterranean formations to cause signals to traverse through the subterranean formations underneath the seafloor for receipt by a receiver, wherein the at least two electrodes comprise two pairs of electrodes configured to produce the electric dipole and a magnetic dipole.

13. The multi-component field source of claim 12, wherein the electric and magnetic dipoles are in different orientations.

14. A method for logging subterranean formations, comprising:

transmitting electromagnetic energy into the subterranean formations with at least two electrodes having a direction of motion and configured to produce an electric dipole in an orientation that is not substantially parallel to both the direction of motion of the electrodes and a seafloor such that said electrical dipole includes a vertical component and a horizontal component, wherein each of the two electrodes is associated with a corresponding different position control device, and wherein the at least two electrodes comprise two pairs of electrodes configured to produce one selected from among: (1) the electric dipole and a magnetic dipole, and (2) two electric dipoles in different orientations;

receiving signals that comprise electromagnetic energy that has traversed the subterranean formations; and processing data of the received signals to produce a representation of the subterranean formations.

15. The method of claim 14, further comprising deriving a property of the subterranean formations from the received signals.

16. The method of claim 14, wherein the vertical component and the horizontal component have substantially equal magnitudes.

17. The method of claim 14, wherein the two pairs of electrodes are operated in a temporally alternating manner.

18. The method of claim 14, wherein the two pairs of electrodes are operated at different frequencies.

19. The method of claim 14, wherein one of the two electric dipoles lie in a horizontal plane.

20. The method of claim 14, wherein one of the two electric dipoles is in a direction that forms an angle with respect to a horizontal plane.

21. The method of claim 14, wherein the electric dipole and the magnetic dipole are in different orientations.

22. The method of claim 14, further comprising towing the two pairs of electrodes through water in the direction of motion.

23. The method of claim 14, wherein the orientation is angled with respect to the seafloor.

24. The method of claim 14, wherein the position control device associated with each electrode is a position control fish whose position is dynamically controllable to control a position of the corresponding electrode.

25. The method of claim 14, wherein each of the position control devices includes wings to provide positioning in a body of water.

26. A method for logging subterranean formations, comprising:

transmitting electromagnetic energy into the subterranean formations with at least two electrodes having a direction of motion and configured to produce a dipole in an orientation that is not substantially parallel to both the direction of motion of the electrodes and a seafloor such that said dipole includes a vertical component and a horizontal component, wherein each of the two electrodes is associated with a corresponding different position control device, wherein the at least two electrodes comprise two pairs of electrodes configured to produce two magnetic dipoles in different orientations;

receiving signals that comprise electromagnetic energy that has traversed the subterranean formations; and processing data of the received signals to produce a representation of the subterranean formations.

* * * * *